United States Patent [19]

Bonga

[11] 4,453,070
[45] Jun. 5, 1984

[54] APPARATUS FOR ORIENTING THE WIRE ELECTRODE SUPPORT AND GUIDE MEMBER AND THE MACHINING FLUID NOZZLE OF A TRAVELLING WIRE EDM APPARATUS

[75] Inventor: Benno I. Bonga, Crans, Switzerland

[73] Assignee: Ateliers des Charmilles S.A., Geneva, Switzerland

[21] Appl. No.: 395,299

[22] Filed: Jul. 6, 1982

[51] Int. Cl.$^3$ .............................................. B23P 1/08
[52] U.S. Cl. ............................. 219/69 W; 219/69 R
[58] Field of Search ............... 219/69 R, 69 W, 69 G, 219/69 M, 69 E

[56] References Cited

U.S. PATENT DOCUMENTS

| | | | |
|---|---|---|---|
| 4,353,785 | 10/1982 | Inoue | 219/69 M |
| 4,355,223 | 10/1982 | Inoue et al. | 219/69 W |
| 4,363,949 | 12/1982 | Pfau et al. | 219/69 W |

FOREIGN PATENT DOCUMENTS

| | | | |
|---|---|---|---|
| 2809506 | 9/1979 | Fed. Rep. of Germany | 219/69 W |
| 2942202 | 9/1980 | Fed. Rep. of Germany | 219/69 W |
| 55-54137 | 4/1980 | Japan | 219/69 W |
| 2042958 | 10/1980 | United Kingdom | 219/69 W |

Primary Examiner—M. H. Paschall
Attorney, Agent, or Firm—Hauke and Patalidis

[57] ABSTRACT

An orientable unitary assembly for the support and guide member for the electrode wire of a travelling wire EDM apparatus, the assembly also comprising a nozzle supplying a machining fluid jet coaxial to the electrode wire. The assembly is supported by a cross-slide table permitting to incline the axis of the wire relative to a wire support and guide member disposed on the other side of a workpiece. The displacements of the slides of the cross-slide table are effected by lead-screws each driven by a servo motor, and the orientation of the assembly is controlled by the same servo motors via second screwthreads of different pitch each displacing a nut which, through a push-rod, controls the inclination of the assembly.

3 Claims, 5 Drawing Figures

U.S. Patent   Jun. 5, 1984   4,453,070
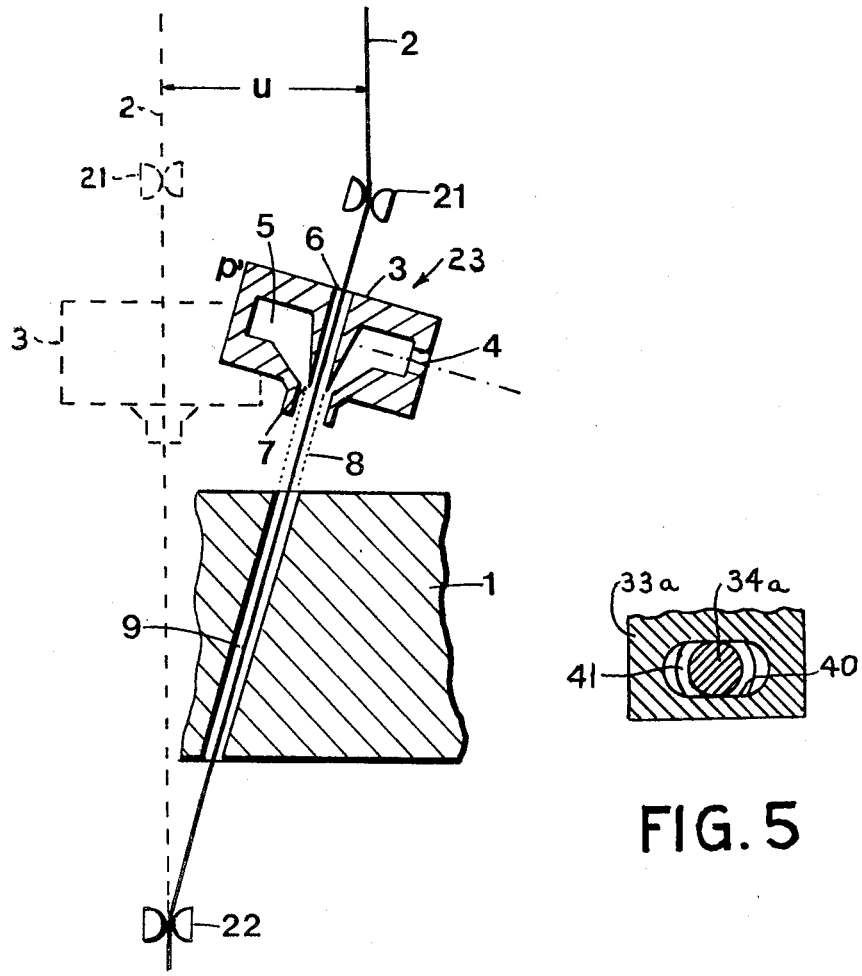
FIG. 1
FIG. 5
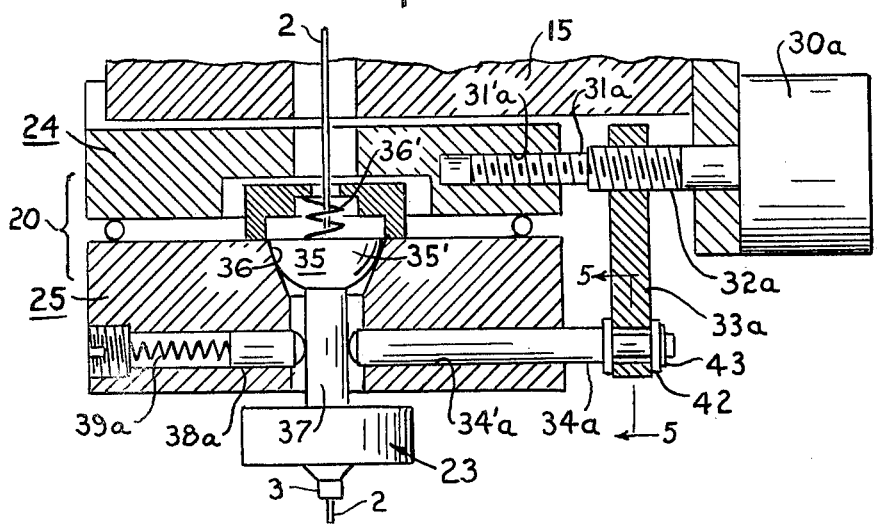
FIG. 4

APPARATUS FOR ORIENTING THE WIRE ELECTRODE SUPPORT AND GUIDE MEMBER AND THE MACHINING FLUID NOZZLE OF A TRAVELLING WIRE EDM APPARATUS

CROSS-REFERENCE TO RELATED APPLICATION

The present invention is related to application Ser. No. 395,297, also filed on July 3, 1982 and assigned to the same assignee as the present application.

BACKGROUND OF THE INVENTION

The present invention relates to travelling wire EDM apparatus in general, and more particularly to a device for orienting the electrode wire support and guide member and the machining fluid injection nozzle of a travelling wire EDM apparatus.

It is known to provide travelling wire EDM apparatus with a device permitting to controllably orient the electrode wire support and guide member and to aim in an appropriate direction a nozzle injecting machining fluid in the machining zone between the electrode wire and the workpiece, the EDM apparatus comprising a support for the electrode wire guide member, a support for the workpiece, means for relatively displacing the electrode wire guide member support and the workpiece support such as to cut the workpiece according to a desired path, a cross-slide table supporting the electrode wire guide member relative to the guide member support, a pair of leadscrews each driven by a servo motor for controlling the displacement of the table cross-slides respectively in two directions transverse to the longitudinal axis of the wire, and means for orienting the guide member relative to the plane of the transverse displacements along the axis of the portion of the wire in the machining zone.

Such a device is disclosed for example in French Pat. No. 2,454,869. Such devices are generally relatively complicated and rely on electronic devices for determining the inclination of the guide member.

SUMMARY OF THE INVENTION

The present invention has for object to provide an arrangement for orienting a unitary assembly incorporating a travelling wire guide member and a machining fluid nozzle, which has a simple, relatively uncomplicated and compact structure, and in which the correct orientation of the unitary assembly is achieved by a strictly mechanical structure from the displacements of the cross-slide table.

For that purpose, a device according to the invention contemplates that each of the leadscrews controlling the displacement of a cross-slide table supporting a unitary assembly forming a combination machining fluid nozzle and electrode wire support and guide member comprises a second screwthread having a pitch different from that controlling the displacements of the table. The second screwthread is arranged for displacing a nut in the same direction as the table but at a different speed, and mechanical connection means are provided between each nut and the unitary assembly of the combination fluid nozzle and wire guide member such as to maintain the guide member along the axis of the portion of the wire in the machining zone and the nozzle aimed at the machining zone.

Further objects and advantages of the present invention will become apparent to those skilled in the art when the following description of an example of the best mode contemplated for practicing the invention is read in conjunction with the accompanying drawing wherein:

BRIEF DESCRIPTION OF THE DRAWING

FIG. 1 is a schematic view useful in understanding the principle of the invention;

FIG. 4 is a section along line 4—4 of FIG. 3; and

FIG. 5 is a partial section along line 5—5 of FIG. 4.

DETAILED DESCRIPTION OF THE PREFERRED EMBODIMENT

Figure 2:
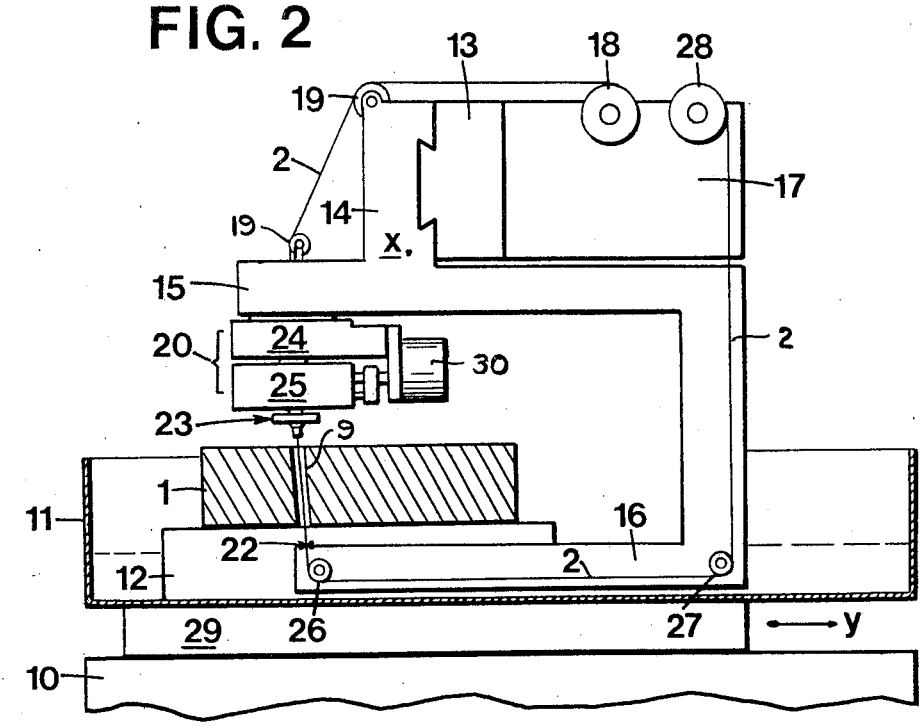
FIG. 2 is a side elevation view of a travelling wire EDM apparatus incorporating the invention.

FIG. 1 of the drawing illustrates an electrode workpiece 1 in the process of being cut by means of an electrode wire 2 supported and guided by a pair of guide members 21 and 22, one disposed on one side of the other on the other side of the workpiece 1. The electrode wire 2 passes through a nozzle 3 such that the nozzle surrounds the wire. The nozzle 3 has a dielectric fluid inlet 4 leading into an annular chamber 5 surrounding a channel 6 through which passes the electrode wire 2. The dielectric fluid introduced into the annular chamber 5 flows through an annular outlet such as to form a jet 8 surrounding the wire and directed towards the machining zone 9 between the electrode wire 2 and the workpiece 1. The nozzle 3 and the wire guide member 21 form a unitary assembly, generally designated at 23, for guiding the wire 2 and injecting dielectric fluid in the machining zone 9. When the upper wire guide member 21 is in the position illustrated in dashed line, the nozzle 3 and the electrode wire 2 are also in the position represented in dashed lines. When the guide member 21 is displaced of a distance u from the position shown in dashed lines to the position shown in full lines, the nozzle 3 must be oriented in a direction corresponding to the inclination of the wire 2, such that the dielectric fluid jet 8 remains coaxial to the wire 2.

As schematically illustrated at FIG. 2, a travelling wire EDM apparatus comprises a base 10 supporting a tank 11 in which the workpiece 1 is held by way of a workpiece support member 12. An overhead bridge member 13 is supported from the apparatus base 10, and the overhead bridge member 13 slidably supports a generally U-shaped electrode wire support member 14 provided with an upper arm 15 and a lower arm 16.

A support plate 17 carries a supply reel or spool 18 supplying the wire 2 forming the electrode tool for cutting the workpiece 1. The wire 2, after passing over the rollers 19, is fed through a support 20 carrying the fluid injection and wire guide member unitary assembly 23 which, as previously mentioned, comprise the nozzle 3 and the wire guide member 21 as schematically illustrated at FIG. 1. The support 20 is in the form of a cross-slide table having a pair of slides 24 and 25 each displaceable in a direction generally perpendicular to the direction of displacement of the other. The cross-slide table 20 permits to displace the assembly 23 relative to the support arm 15 for providing the wire 2, in the machining zone 9, with a desired inclination, for the purpose of effecting a cut in the workpiece 1 provided with walls disposed at an angle.

After passage through the lower wire guide member 22, the wire 2 is fed over a pair of rollers 26 and 27 and winds itself over a receiving spool 28 also supported by the support plate 17. As is well known in the art, means are provided for displacing a table 29 supporting the tank 11 and the workpiece 1 along a Y-axis, and the wire support member 14 relative to the overhead bridge member 13 along a X-axis, perpendicular to the plane of the drawing. The combination of the relative displacements along the Y- and X-axes permits to achieve a cut of desired path through the workpiece 1.

Figure 3:
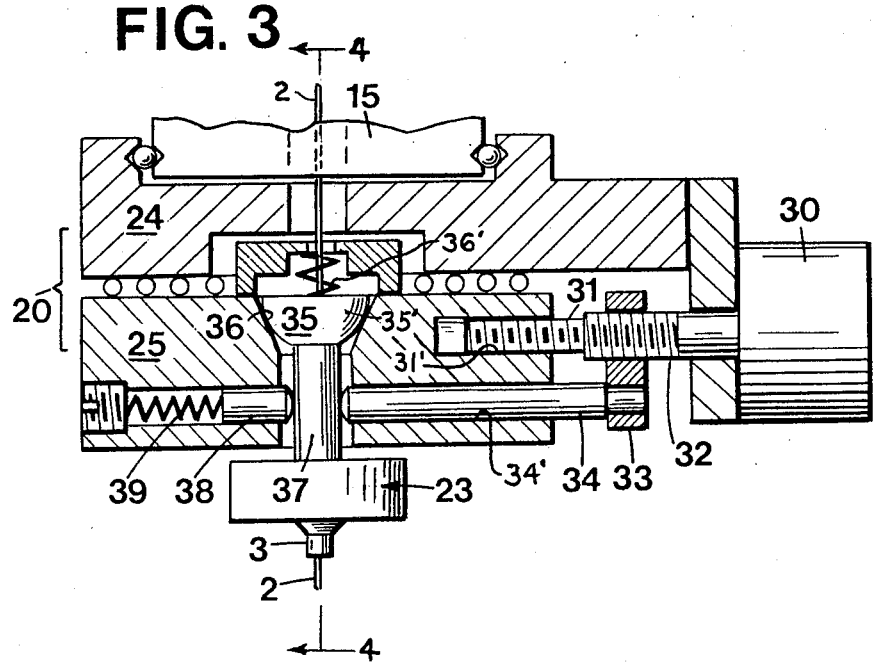
FIG. 3 is a section, at an enlarged scale, of a portion of the apparatus of FIG. 2.

FIG. 3 illustrates, in cross-section, the structure permitting to incline the wire guide and nozzle assembly 23 as a function of the relative displacement of the slides 24 and 25 of the cross-slide table 20. The displacement of the slide 25 relative to the slide 24 is effected by a servo motor 30, for example taking the form of a stepping motor, which is mounted on the slide 24 and which has an output shaft provided with a screwthread 31 meshing in a threaded bore 31' in the slide 25. The output shaft of the servo motor 30 has a second portion provided with a screwthread 32 threading in a nut 33 carrying a plunger 34 slidably disposed in a bore 34' in the slide 25. The assembly 23 is mounted on a holder 35 having a substantially hemispherical head portion 35' engaged in a tapered bore 36 such as to form a universal joint, or swivel joint, allowing the assembly 23 to occupy any of a multiplicity of inclinations relative to a perpendicular to the slide 25. The holder 35 of the unitary assembly, or head, formed by the nozzle 3 and the wire support and guide member 21 has a cylindrical portion 37 engaged on one side by the end of the cylindrical rod 34 and on the other diametrally opposed side by the end of a plunger 38 urged by a spring 39 in the direction causing a portion of the peripheral surface of the holder cylindrical portion 37 to firmly engage the end of the rod 34.

The pitch of the screwthread 31 on the output shaft of the servo motor 30 is different from the pitch of the leadscrew screwthread 32, such that for each amount of displacement of the slide 25 relative to the slide 24 there results a relative displacement of the rod 34 relative to the slide 25. The difference between the screwthread pitches and the distance between the center of rotation of the hemispherical end portion 35' of the holder 35 and the point on the holder cylindrical portion 37 at which the force transmitted by the rod 34 is applied are arranged such as to achieve an inclination of the unitary assembly, or head, 23 causing it to remain oriented in the direction of the wire lower guide member 22, FIG. 2, during displacement of the slide 25 relative to the slide 24.

The linear displacements of the slide 24 relative to the upper support arm 15 are controlled, in a same manner, by means of a servo motor 30a, FIG. 4, having a screwthread 31a threadably engaged in a threaded bore 31a' in the slide 24, and a second screwthread 32a threading through a nut 33a. The nut 33a displaces a rod 34a slidable in a bore 34a' in the lower slide 24 of the cross-slide table 20. A plunger 38a is constantly urged by a spring 39a in engagement with the peripheral cylindrical surface 37 of the holder 35' such as to apply a substantially diametrally opposed portion of the cylindrical surface of the cylindrical portion 37 against the end of the rod 34a. In order to enable the displacement of the slide 25 relative to the slide 24 without binding, the rod 34a is affixed to the nut 33a through a slot 40, FIG. 5, the rod 34a being provided, for example, with a shoulder 41 engaging a surface of the nut 33a and being held, at its end beyond the shoulder 41, in the slot 40 by means of, for example, a washer 42 and a retainer ring 43 engaged in an appropriate peripheral groove in the end of the rod 34a, such that the rod can be displaced longitudinally in the bore 34a' in the slide 25 in the same manner as the rod 34 can be displaced in the bore 34'. As the rods 34 and 34a are disposed with their axes substantially perpendicular to each other through their respective bores 34' and 34a' in the slide 25, the fluid injection nozzle and wire guide assembly, or head, 23 is capable of being oriented in any appropriate direction such as to provide an appropriate orientation of the nozzle 3, FIG. 1, relative to the wire support guide 21, such that the jet 8 of dielectric fluid remains constantly coaxial to the electrode wire 2 and directed towards the machining zone 9.

In the example of structure illustrated, the lower wire guide member 22 is stationary, but it will be readily apparent to those skilled in the art that the stationary guide member 22 may be replaced by an orientable fluid injection and wire guide unitary assembly or head supported by a universal joint holder and interconnected with the upper fluid injection and wire guide unitary assembly or head 23 by mechanical or electrical means, such that the lower fluid injection and wire guide unitary assembly, or head, is capable of orientation corresponding to that of the upper one, dielectric fluid being thus injected into the machining zone from both above and below the workpiece 1.

Having thus described the present invention by way of an example of structure well designed to achieve the objects of the invention, modification whereof will be apparent to those skilled in the art, what is claimed as new is as follows:

1. In a travelling wire EDM apparatus wherein a workpiece is cut by electrical discharged between an electrode wire and said workpiece, said apparatus comprising a pair of electrode wire guide member, support means for said workpiece and means for relatively displacing said electrode wire guide members and said workpiece support means such as to cut said workpiece according to a desired shape, and a mechanism for orienting at least one unitary assembly comprising one of said electrode wire guide members and a nozzle for injecting machining fluid in a machining zone between said electrode wire and said workpiece, said mechanism comprising a holder for said unitary assembly, a table on which said holder is mounted, swivelling means connecting said holder to said table, a pair of cross-slides supporting said table, a first servo motor driven leadscrew for linearly displacing one of said cross-slides relative to the other, a second servo motor driven leadscrew for linearly displacing the other of said cross-slides relative to said table, such that the direction of displacement of each of said cross-slides is transverse to the longitudinal axis of said electrode wire for causing the electrode-wire to be inclined relative to the workpiece, a second screwthread on each of said leadscrews having a pitch different from the pitch of the screwthread displacing each of said cross-slides, said second screwthread displacing a nut in the same direction as the direction of displacement of said table at a speed different from the speed of displacement of said table, and means connecting each of said nuts to said unitary assembly holder such as to swivel said unitary assembly and maintain said unitary assembly constantly aligned automatically with the longitudinal axis of said electrode wire while passing through the machining zone between the electrode wire and the workpiece.

2. The mechanism of claim 1 wherein said swivelling means by which said unitary assembly holder is mounted on said table is a universal joint, and wherein said means connecting each of said nuts to said holder comprises a rod displaced by each of said nuts and having an end engaged with said holder, and biasing means constantly engaging said holder with said end of said rod.

3. The mechanism of claim 1 wherein said unitary assembly comprises said nozzle disposed concentric to said electrode wire and injecting a coaxial jet of said machining fluid into the machining zone between said electrode wire and said workpiece.

* * * * *

UNITED STATES PATENT AND TRADEMARK OFFICE
CERTIFICATE OF CORRECTION

PATENT NO. : 4,453,070
DATED : June 5, 1984
INVENTOR(S) : Benno Ibo Bonga

It is certified that error appears in the above-identified patent and that said Letters Patent are hereby corrected as shown below:

In the claims:

Column 4, line 37 change "discharged" to --discharges--.

Signed and Sealed this

Twenty-fifth Day of September 1984

[SEAL]

Attest:

GERALD J. MOSSINGHOFF

Attesting Officer

Commissioner of Patents and Trademarks